July 22, 1969   HIDEO OKAMOTO   3,456,624
SEAL CONSTRUCTION FOR ROTARY COMBUSTION ENGINE
Filed Sept. 8, 1967
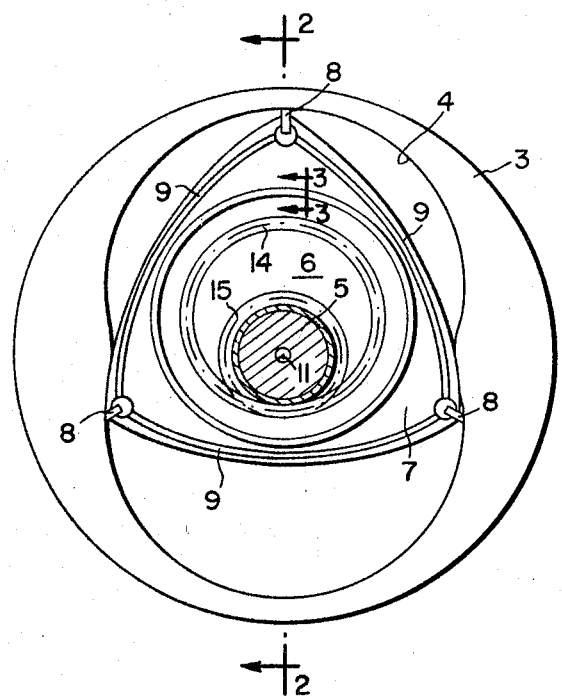
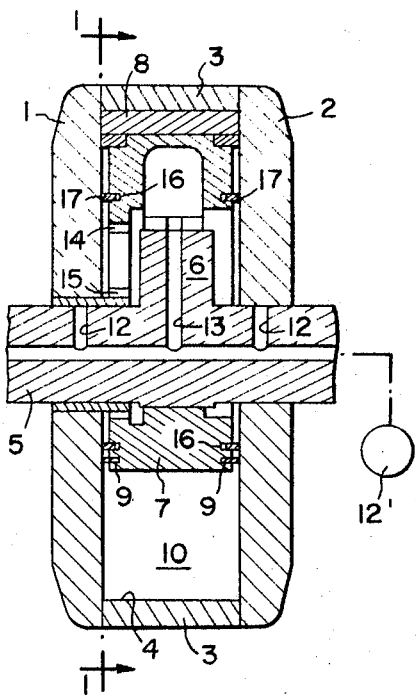
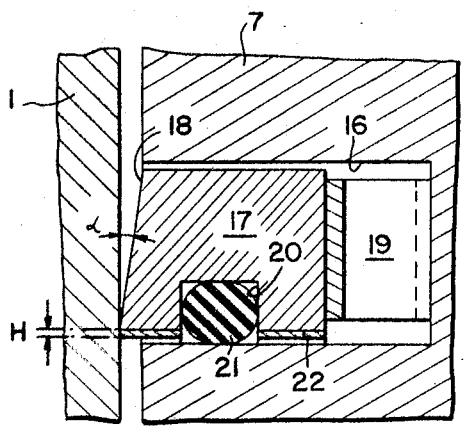
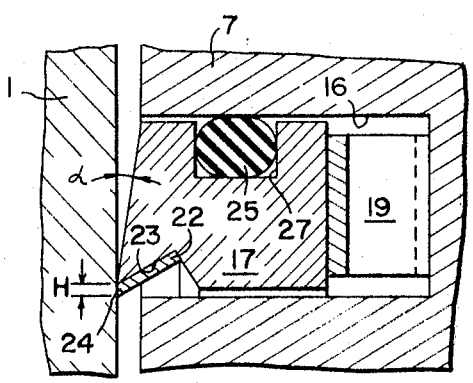
INVENTOR
HIDEO OKAMOTO
BY *Wenderoth, Lind & Ponack*
ATTORNEYS United States Patent Office 3,456,624
Patented July 22, 1969

3,456,624
SEAL CONSTRUCTION FOR ROTARY
COMBUSTION ENGINE
Hideo Okamoto, Kashiwa-shi, Japan, assignor to Toyo
Kogyo Company Limited, Hiroshima-ken, and Nippon
Piston Ring Company Limited, Tokyo-to, Japan
Filed Sept. 8, 1967, Ser. No. 666,247
Claims priority, application Japan, Sept. 10, 1966,
41/60,051
Int. Cl. F01c 19/02
U.S. Cl. 123—8                                    2 Claims

ABSTRACT OF THE DISCLOSURE

A seal construction for a rotary combustion engine comprising an annular seal member axially slidably disposed in an annular groove provided on the opposite end faces of the rotary piston, the seal member having an axial outer end face which is at an angle to the adjacent end wall inner face and having an axial outer and radial inner peripheral edge pointing towards the end wall inner face, and the radial inner surface of the annular seal having a thin wear-resistant layer thereon having a thin and wear-resistant friction contact edge at the axial outer and radial inner peripheral edge of the annular seal member.

---

This invention relates to improvements of a seal construction for a rotary piston internal combustion engine, which maintains durable and efficient sealing contact with an adjacent member, and particularly relates to an improvement of such a seal construction which is adapted for sealing between the rotary piston end face and the adjacent end wall and which provides an excellent and durable oil and air tight seal therebetween.

In general, rotary piston internal combustion engines comprise a housing having axially spaced parallel end walls having substantially flat internal surfaces and an annular casing having an epitrochoidal internal peripheral wall with two or more lobes between the end walls and defining a cavity therebetween. A rotary piston is journaled in the cavity on an eccentric portion of a shaft which is coaxial with the cavity and journaled in bearings in the end walls. The piston has substantially flat end faces disposed adjacent to the inner flat face of the end walls and has a peripheral surface with a plurality of circumferentially spaced apex portions adapted for sealing engagement with the epitrochoidal internal wall of the annular casing to form a plurality of working chambers between the housing and the piston which vary in volume during the planetary motion of the piston as the shaft rotates. The piston end faces are ordinarily provided with annular grooves in which seals are inserted for sealing engagement with adjacent end wall inner faces for the purpose of preventing leakage of lubricating and/or cooling oil, or working fluid along the piston end faces. In order to assure the sealing engagement of the annular seals with the end wall inner faces, the seals are urged by spring means or the like in the direction of the shaft and outward of the piston end faces.

For the purpose of lubricating the journal portions and cooling the rotary piston, the lubricating oil is caused to flow through or along those elements by various means such as a pump, and, since this oil is, as a matter of course, caused to flow between the opposite end faces of the rotary piston and the adjacent end wall internal surfaces, it is necessary to provide efficient oil and air seals to block the leakage of the oil into the working chambers, in order to minimize the burning of the oil and in order to prevent the generation of the carbon slag during operation of the engine. In view of these problems and in order to provide an engine with better durability and higher output, the sealing between the rotary piston end faces and adjacent end wall internal surfaces is one of the important considerations in an engine of the type described. Among the sealing actions of the annular seals which sealingly engage with the adjacent end wall internal surfaces, the action of scraping or wiping the end wall internal surfaces in order not to permit oil film on the end walls to flow into the working chambers, is one of the important factors of the sealing function.

For the purpose of efficient sealing contact of the annular seals on the opposite end faces of the piston with the adjacent end wall internal surface to produce the last-mentioned oil-scraping action, there has been recommended a sealing ring having an axial outer sealing surface at a relatively minute angle with the end wall so that the axial outer and radial inner peripheral edge of the ring points towards the end wall and sealingly engages with the internal surface of the end wall. During operation of the engine, the said sealing ring moves, with the planetary motion of the piston, in frictional contact with the internal surface of the end wall at the said axially outwardly pointing peripheral edge, and effective and sharp oil scraping and tight sealing has been improved to some extent. The defect of the seals of the type above described is, however, that the development of the wear at the said peripheral edge of the seal ring causes a relatively rapid enlargement of the frictional contact surface of the sealing ring and a reduced frictional contact with the adjacent end wall which considerably reduces the sealing effect therebetween.

An object of the present invention is to provide a sealing ring for effectively sealing the rotary piston engine against leakage, especially oil leakage into the working chambers.

Another object of the invention is to provide a sealing ring in which a wear-resistant layer is effectively incorporated.

A further object of the invention is to provide a sealing ring having an axial outer surface which is at an angle to the housing end wall so that the radial inner peripheral edge points towards the end wall, and the said radial inner peripheral edge is reinforced by providing the wear-resistant layer on the radial inner surface of the sealing ring.

Another object of the invention is to provide a sealing ring which has the radially inner wear-resistant layer extending substantially perpendicularly to the housing end wall.

A further object of the invention is to provide a sealing ring wherein the axial outer and radial inner peripheral edge pointing generally radially inwardly and partially axially outwardly has a wear-resistant layer on the conical radial inner surface thereof.

Further objects and advantages of the invention will become apparent from the following description taken in connection with the drawings in which:

FIG. 1 is a diagrammatic cross-sectional elevation view of a rotary piston internal combustion engine provided with the present invention, which view is taken along the line 1—1 of FIG. 2;

FIG. 2 is a longitudinal sectional view of a rotary piston internal combustion engine, taken along the line 2—2 of FIG. 1;

FIG. 3 is an enlarged sectional view of a part of the engine of FIG. 1, taken along the line 3—3 of FIG. 1, and showing a detailed cross-section of the seal construction according to the invention; and FIG. 4 is an enlarged view, similar to FIG. 3, and showing a modification of the seal construction according to the invention.

As shown in FIGS. 1 and 2, the rotary piston internal combustion engine comprises a housing composed of axially spaced end walls 1 and 2, both having substantially flat inner faces, and an annular wall 3 disposed between and interconnecting said end walls to define a cavity within the housing. The inner surface 4 of the annular wall 3 preferably has a multi-lobed cross-sectional profile which is basically an epitrochoid. A shaft 5 extends coaxially of the cavity within the housing and is journaled in bearings in the walls 1 and 2. Eccentrically disposed in the housing and journaled on an eccentric portion 6 of the shaft 5 is a rotary piston 7 having a plurality of circumferentially-spaced apex portions around its outer periphery. Each of said apex portions has radially movable apex seal means 8 which are in continuous sealing engagement with the center wall inner surface 4. The opposite ends of the rotary piston are substantially flat faces having side seal strips 9 extending between pairs of apex seals 8, and the side seal strips 9 sealingly engaging the end walls 1 and 2 thereby forming, together with the apex seals 8, a plurality of working chambers 10 which vary in volume when the rotary piston 7 rotates within and relative to the housing. During the rotation of the piston 7 and the variation of the volume of the working chambers 10, the intake, compression, power and exhaust strokes are performed. Intake of combustible gas and exhausting of the products of combustion is carried out by means of conventional intake and exhaust ports (not shown). Extending axially through the shaft 5 is a longitudinal bore 11 which is connected with a source of cooling and lubricating oil so that the oil is urged, by means of a pump 12', to flow through the said bore 11 for the necessary cooling and lubrication of the engine. Branch holes 12 and 13 connect the longitudinal bore 11 with portions in the engine requiring lubrication and cooling. Coaxially secured to the rotary piston in an axial aperture or recess thereof is an internally toothed gear 14, which meshes with an externally toothed gear 15 coaxial with the shaft 5 and secured to one of the end walls for producing the relative motion of the rotary piston and the housing.

Radially inwardly spaced from the side seal strips 9 and opening outwardly on each end face of the piston 7 in the direction of the axis of the shaft 5 is an annular groove 16 in which the seal construction to which the present invention is directed is disposed. As illustrated on an enlarged scale in FIG. 3, an annular sealing ring 17 has an axial outer surface 18 which is at an angle α to the end wall 1 or 2 so that the radial inner peripheral edge of the ring 17 points towards the end wall 1 or 2 and sealingly engages with the internal surface of the end wall. Sealing ring 17 is disposed in the groove 16. Disposed between axial inner bottom of the groove 16 and the sealing ring 17 is a spring means 19, which acts in an axial direction and urges the sealing ring 17 axially outwardly so that the axially outwardly pointing edge of the ring 17 sealingly engages with the end wall internal surface. Radially inwardly opening on the radial inner surface of the seal ring 17 is an annular groove 20 in which an O-ring seal 21 is sealingly disposed for providing a tight seal between the sealing ring 17 and the radially outwardly facing wall of the groove 16.

The sealing ring 17 has a wear-resistant radial inner surface 22 in the form of a thin layer 22 having a thickness H the axial outer end of which is in sealing frictional engagement with the internal surface of the end wall 1 or 2. The layer 22 is of a material which is hard and highly wear-resistant relative to the material of the ring 17 and can be formed by coating the radial inner surface of the ring 17 by, for instance, hard-chromium, spraying molybdenum or nitriding the said surface. When the sealing ring 17 thus formed is urged in an axial outward direction by the action of the spring means 19 there will be a subtstantial friction force produced between the axial outer end of the thin layer 22 on the sealing ring 17 and the adjacent end wall during operation of the engine. Due to thinness of the layer 22 and the specific wear-resistant character of the layer, the frictional engagement with the end wall and the action of scraping the oil from the internal surface of the end wall is considerably improved. The frictional contact surface of the sealing ring 17 remains substantially only the limited area of the axial end face of the thin layer 22, and owing to the high wear-resistivity of the layer, the defect of rapid enlargement of the frictional contact surface, due to angle α of the sealing ring end face, and the wear thereon beyond the thin axial layer is substantially eliminated. Further, even if wear should take place on the sealing edge of the tapered end surface of the ring 17 beyond the thin layer 22, the difference of the wear-resistivity between the wear-resistant layer 22 and the sealing 17, which is relatively low in wear resistivity, will continue to result in a sharp frictional sealing contact by the layer 22 with the end wall and prevent the deterioration of the sealing effect due to enlargement of the sealing ring and friction surface.

The O-ring seal 21 can be of various materials which provide tight sealing especially against oil-leakage between the seal ring 17 and the radial wall of the groove 16, and is disposed within the groove 20 to produce the sealing described.

According to the present invention, the sealing ring 17 itself can be of relatively low wear-resistant material, yet an excellent sealing effect, and especially an excellent oil-scraping function with considerable improvement in durability of the seal construction is obtained. Further, since the sealing frictional contact of the sealing ring 17 with the end wall inner face is maintained at the axial outer end of the thin layer 22, deterioration of the frictional force between the sealing ring 17 and the end wall, due to the enlargement of the sealing ring friction surface because of wearing, is substantially eliminated, and at the same time, the durable sharp scraping edge of the sealing ring 17 is maintained at the axial outer and the radial inner end corner of the layer 22.

FIG. 4 shows a different sealing ring construction wherein a conical radial inner surface 23 is provided on the sealing ring 17, which surface 23 is at an angle relative to the end wall inner face so that the axial outer end sealing contact edge 24 points radially inwardly at an acute angle. The conical surface 23 is likewise coated with the thin and hard wear-resistant layer 22, as described with respect to FIG. 3. The layer 22 on the conical surface 23 in this modification is sealingly engaged with the inner face of the end wall at an acute angle, so that the scraping of oil from the end wall inner face is performed efficiently. The O-ring 25 in this modification has been moved to the radially inwardly facing wall of the groove 16 and is disposed within a groove 27 provided on the radially outer surface of the seal ring 17 to form a tight seal between the sealing ring 17 and the radial wall of the groove 16. The means for urging the sealing ring 17 axially outwardly in this modification is similar to that shown in FIG. 3 and employs the spring means 19 disposed at the axial inner end of the seal ring 17.

Various methods of making the sealing ring 17 are possible, but it will be preferable that the axial outer end face 18 at the angle α be preferably shaped by machining after providing the wear-resistant layer 22 on the radial inner surface of the sealing ring 17.

What is claimed is:

1. A seal construction for a rotary combustion engine which has a housing composed of spaced end walls and an annular wall interconnecting the end walls to define a cavity within the housing, a rotary piston rotatably mounted within said housing and having end faces disposed adjacent to the inner surfaces of said end walls and having a peripheral surface cooperating with the annular wall of the housing to define a plurality of working chambers therebetween, said seal construction comprising an annular groove provided on each end face of the rotary piston, an annular sealing ring axially slidably positioned in said annular groove, said sealing ring having an axial outer end face at an angle with the inner face of the end wall with the axial outer and radial inner peripheral edge of the ring pointing towards the inner face of the end wall, a hard wear-resistant layer provided on the radial inner surface of said annular sealing ring, and a spring means disposed in said annular groove and urging said annular sealing ring axially outwardly of said groove so that the axial outer end of said wear-resistant layer sealing engages with the inner surface of the end wall for efficient scraping of oil therefrom.

2. A seal construction for a rotary combustion engine which has a housing composed of spaced end walls and an annular wall interconnecting the end walls to define a cavity within the housing, a rotary piston rotatably mounted within said housing and having end faces disposed adjacent to the inner surfaces of said end walls and having a peripheral surface cooperating with the annular wall of the housing to define a plurality of working chambers therebetween, said seal construction comprising an annular groove provided on each end face of the rotary piston, an annular sealing ring axially slidably positioned in said annular groove, said sealing ring having an axial outer end face at an angle with the inner face of the end wall and a conical radial inner surface forming a peripheral sealing edge pointing mostly radially inwardly and partially axially outwardly, a hard wear-resistant layer provided on said conical radial inner surface and a spring means disposed in said annular groove and urging said annular sealing ring axially outwardly of said groove so that the axial outer end of said wear-resistant layer engages with the inner surface of the end wall for efficient scraping of oil therefrom.

References Cited
UNITED STATES PATENTS

| | | |
|---|---|---|
| 3,155,313 | 11/1964 | Bentele _____ 230—145 X |
| 3,171,590 | 3/1965 | Bentele et al. |
| 3,180,563 | 4/1965 | Jones et al. _____ 230—145 |
| 3,300,127 | 1/1967 | Yamamoto et al. |
| 3,309,011 | 3/1967 | Osakada et al. |

LEONARD H. GERIN, Primary Examiner

U.S. Cl. X.R.
60—39.61; 91—56